June 27, 1933.     P. J. CARLISLE     1,915,354
MANUFACTURE OF CHLOROFORM
Filed Oct. 8, 1930
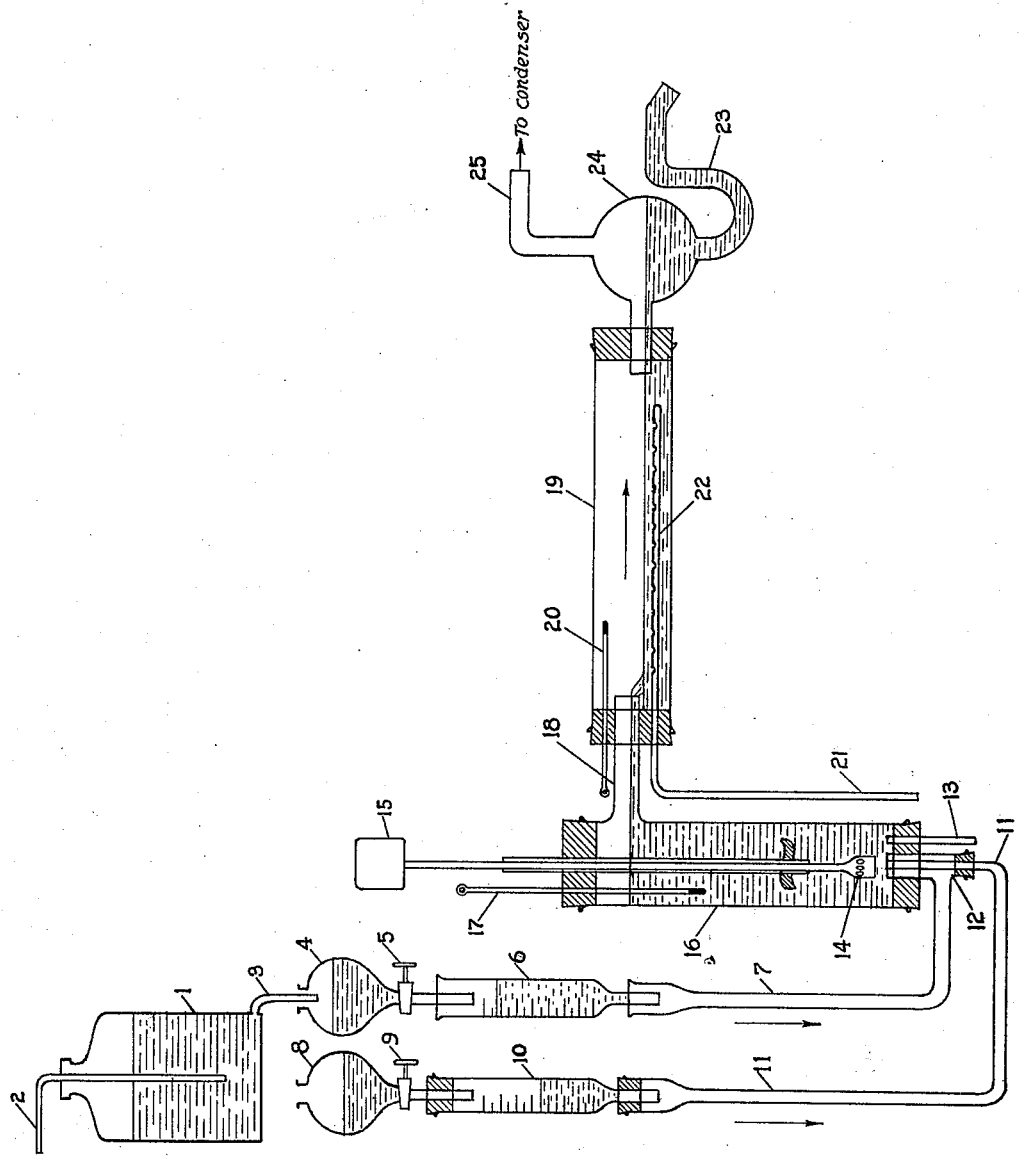
INVENTOR.
Paul Johnson Carlisle.
BY
Paul M. Paulson
ATTORNEY Patented June 27, 1933

1,915,354

UNITED STATES PATENT OFFICE

PAUL JOHNSON CARLISLE, OF NIAGARA FALLS, NEW YORK, ASSIGNOR, BY MESNE ASSIGNMENTS, TO E. I. DU PONT DE NEMOURS AND COMPANY, A CORPORATION OF DELAWARE

MANUFACTURE OF CHLOROFORM

Application filed October 8, 1930. Serial No. 487,152.

This invention relates to the manufacture of chloroform by the treatment of organic carbonyl compounds with aqueous solutions containing active chlorine. More particularly, it relates to the production of chloroform by the reaction of hypochlorite with ketones or aldehydes.

Various processes for the chlorination of aldehydes or ketones by means of hypochlorite solutions have been proposed, which give low yields of chloroform.

My experimental work has led me to believe that there are several possible explanations of the low yields obtained in these prior batch processes. In the first place, when one reactant is passed into a large body of the other, there is at first an excess of one reactant which is too large for the best results. Another possible cause of low yield is the decrease of hypochlorite ion concentration and the corresponding increase in the hydroxide concentration as the reaction proceeds. The hydroxide may cause condensation or polymerization of the unreacted carbonyl compound or hydrolysis of the chloroform. The lowered concentration of hypochlorite ions also probably decreases the speed of the main reaction and thus favors undesirable side reactions.

One object of this invention is to provide a continuous and efficient process for the manufacture of chloroform from organic carbonyl compounds such as an aldehyde or a ketone.

A further object is to provide a method of utilizing "liquid bleach" and "liquid bleach sludge", a by-product occurring in the manufacture of "liquid bleach", as sources of hypochlorite for the manufacture of chloroform.

"Liquid bleach", designates the calcium hypochlorite solution obtained by treating milk of lime with chlorine and subsequently separating solids. "Liquid bleach sludge" consists of "liquid bleach" mixed with solids, such as calcium carbonate and undissolved calcium hydroxide. These solids appear to behave as inert material in my herein described process.

I have now found that chloroform may be obtained in good yield by the reaction of a carbonyl compound, such as a ketone or aldehyde with a hypochlorite by keeping both the concentration of hypochlorite and the relative proportions of the reactants fairly constant during the reaction; by avoiding a large excess of either reactant; by mixing the reactants quickly and thoroughly at a temperature above 60° C., and by removing the chloroform from the reaction mixture practically as fast as it is formed. Such conditions exist when the reactants are continuously and simultaneously added to a mixing vessel and the chloroform is continuously removed from the reaction mixture.

The figure in the attached drawing shows diagrammatically an apparatus suitable for carrying out the invention. 1 is a reservoir equipped with an air inlet 2 and liquid outlet 3. 4 is an auxiliary reservoir connected to 3, provided with stopcock 5, and joining flowmeter 6. Tubes 7 and 12 connect flowmeter 6 with the lower portion of the reaction vessel 16. 8, 9, 10, and 11 form a similar parallel system comprising an auxiliary reservoir, stopcock, flowmeter and tube also connected to the lower portion of vessel 16. Reaction vessel 16 is provided with agitator 14 driven by motor 15. Vessel 16 is also provided with steam inlet 13 and thermometer 17. Tube 18 joins the upper portion of reactor 16 to still 19. Tube 21 leads within the still and there ends in perforated tube 22; a thermometer 20 is also inserted in still 19. The exit of still 19 connects with a trap or separator 24 having a vapor outlet 25 and liquid outlet 23.

One way of carrying out this invention will now be described by reference to the drawing. The hypochlorite reservoir 1 is charged with a hypochlorite solution. If liquid bleach sludge is used, air is forced in through tube 2 to maintain the solids in suspension or mechanical agitator may be used. The liquid passes through the tube 3 into the auxiliary reservoir 4, and thence through the flowmeter 6 and tubes 7 and 12 into the reaction chamber 16. The rate of flow is controlled by stopcock 5.

Either acetone or acetaldehyde, preferably in aqueous solution, is charged into reservoir 8, from whence it passes through the flowmeter 10, and tube 11 to the reaction chamber 16. Its rate of flow is controlled by stopcock 9.

The two liquids enter the reaction chamber 16 by way of the concentrically arranged tubes 11 and 12 and are thoroughly mixed by the agitator 14. Steam is introduced through the tube 13 at such a rate as to maintain the temperature of the reaction mixture, indicated by the thermometer 17, at about 70° to 80° C.

The reaction residue, which is a sludge or slurry if bleach sludge is used, overflows through tube 18, accompanied by chloroform and water vapors, into the steamer 19. Steam, flowing through tube 21, is forced through the perforated tube 22 covered by the residue. The steam keeps the residue thoroughly agitated and distills off the last traces of chloroform. The mixed chloroform and water vapors and the spent residue pass into the trap 24, where they are separated, the residue passing out through tube 23 and the chloroform and water vapors passing through tube 25 to a suitable condenser. The condensate forms two layers on standing, and the chloroform is drawn off.

The relative rates of flow of carbonyl compound and bleach are preferably adjusted so that the amount of available chlorine in the bleach is in about 10–25% excess over that required to react with the carbonyl compound and so that about 2.5 to 12.5 minutes are required for the reactants to flow from the inlet to the outlet of the reaction chamber. However, this invention is not limited to these specific rates of flow of reactants since these may be considerably varied dependent on stirring and type of apparatus. The hypochlorite concentration of the bleach may also vary considerably; but I prefer to use bleach containing hypochlorite in amounts equivalent to more than 40 grams per liter of available chlorine.

The temperature of the reacting materials is preferably maintained at 70–80° C. Other temperatures may be used, but somewhat smaller yields are obtained if temperatures below 70° C. are used. It is desirable to maintain the reaction mixture at a temperature above the boiling point of chloroform, in order to remove the product continually as chloroform vapor. There is no apparent advantage in using temperatures above 80° C. The vapors may be removed from the reaction chamber directly to a condenser, they may be allowed to pass through the steamer before condensation, or they may be removed separately, from both the reaction chamber and steamer, and condensed.

The process may be operated without the steamer 19, or its equivalent; but if this is done, a considerable amount of chloroform is carried out with the reaction residue. This is especially true when bleach sludge is used. For effective operation, the temperature in the steaming device must of course be maintained above the boiling point of chloroform, and preferably at 80–100° C. Means of heating and agitating other than the described introduction of steam may be employed to remove chloroform from the reaction residues. In place of the horizontal steamer 19, a vertical, packed or baffled tower in which the reaction residue, introduced at the top, flows counter current to steam introduced at the bottom, and chloroform and water vapor are led off through a connection at the top, may be used, but if the process is carried out with liquid bleach sludge, the packing or baffles must be such as will not cause clogging.

As raw materials any aldehyde, ketone or other organic carbonyl compound which is capable of reacting with a hypochlorite to produce chloroform may be employed. This invention is likewise not limited to the use of liquid bleach, but may be practiced by using any solution or sludge containing a reactive hypochlorite, for instance sodium hypochlorite.

Apparatus for carrying out my invention may be constructed of glass, iron, steel or other material commonly used in chemical manufacture and which are not injured by the reactants in any suitable arrangement.

*Example I*

A 46% aqueous solution of acetaldehyde was reacted with liquid bleach sludge by means of the apparatus and procedure described above. During a period of 50 minutes, 197 grams of the aldehyde solution and 9,130 grams of the sludge were passed through the reaction chamber. The available chlorine in the sludge was 81.7 grams per liter, which is equivalent to about 25% excess over that theoretically required to react with the aldehyde. The temperature of the reaction mixture was maintained at about 76° C. and the temperature of the vapors in the steamer at about 95° C. 206 grams of chloroform, equivalent to 84% of the theoretical yield, was obtained by condensing the issuing vapors and separating chloroform from the condensate.

*Example II*

The process was carried out as in Example I, using a 45.6% acetaldehyde solution and a clear calcium hypochlorite solution instead of liquid bleach sludge. During a period of 70 minutes, 290 grams of the acetaldehyde solution and 18,950 grams of calcium hypochlorite solution containing 80 grams of available chlorine per liter were passed through the reaction chamber. The reaction temperature was maintained at about 79° C. and the steamer temperature at about 90° C. 314 grams of chloroform, equivalent to 88% of the theoretical yield, were obtained.

Example III

A 60% aqueous solution of acetone was reacted with clear liquid bleach by means of the apparatus and procedure described above. During a period of 60 minutes, 365.9 grams of the acetone solution and 13,164 grams of the bleach were passed through the reaction chamber. The available chlorine in the bleach was 79.7 grams per liter, which is equivalent to about 15% excess over that theoretically required to react with the acetone. The temperature of the reaction mixture was maintained at about 71° C. and the temperature of the vapors in the steamer at about 95° C. 404 grams of crude chloroform were obtained by condensing the issuing vapors and separating the chloroform from the condensate. The crude chloroform was distilled and 393.8 grams of chloroform were obtained, equivalent to about 87% of the theoretical yield, calculated from the amount of acetone used.

In the claims, "calcium hypochlorite solution" is intended to include any solution, such as liquid bleach, which contains calcium hypochlorite. Similarly, "hypochlorite solution" includes any solution containing hypochlorite whether pure or not.

I claim:

1. Process for manufacture of chloroform comprising continuously flowing together as liquids a hypochlorite solution and an organic carbonyl compound capable of reacting with hypochlorite to produce chloroform while maintaining the relative proportions of hypochlorite and carbonyl compound substantially constant and avoiding a large excess of either reactant.

2. Process for the manufacture of chloroform comprising continuously flowing together as liquids a hypochlorite solution and an organic carbonyl compound capable of reacting with hypochlorite to produce chloroform, at such relative rates that there is an excess of available chlorine, said excess being from 10 to 25%.

3. Process for the manufacture of chloroform comprising continuously flowing together as liquids a calcium hypochlorite solution and an organic carbonyl compound capable of reacting with hypochlorite to produce chloroform at such relative rates that there is an excess of available chlorine, said excess being 10–25%, thoroughly and substantially instantaneously mixing them, heating the mixture and continuously removing vapor containing chloroform from said mixture.

4. Process for manufacture of chloroform comprising continuously flowing together as liquids a calcium hypochlorite solution and an organic carbonyl compound capable of reacting with hypochlorite to produce chloroform while maintaining a constant excess of hypochlorite, said excess being equivalent to not more than about 25% excess of available chlorine, thoroughly and substantially instantaneously mixing them, heating the mixture to a temperature of 70–80° C. while continuously removing vapor containing chloroform therefrom, additionally heating and agitating the residue to separate further chloroform as vapor, condensing said vapors and mechanically separating liquid chloroform from the condensate.

5. Process for manufacture of chloroform comprising continuously flowing together as liquids acetaldehyde and a hypochlorite solution, the relative proportions of said hypochlorite and acetaldehyde being maintained substantially constant without a large excess of either reactant, thoroughly mixing them, heating the mixture, continuously removing vapor containing chloroform therefrom, condensing said vapor and mechanically separating liquid chloroform from the condensate.

6. Process for manufacture of chloroform comprising continuously flowing together as liquids acetaldehyde and a calcium hypochlorite solution, said hypochlorite being maintained in a constant excess of not more than about 25%, thoroughly and substantially instantaneously mixing them, heating the mixture to a temperature of 70–80° C., continuously removing vapor containing chloroform from the mixture, condensing said vapor and mechanically separating liquid chloroform from the condensate.

7. Process for the manufacture of chloroform comprising continuously flowing together as liquids acetaldehyde and a calcium hypochlorite solution at such relative rates that there is an excess of available chlorine, said excess being from 10–25%, thoroughly and substantially instantaneously mixing them, heating the mixture and continuously removing vapor containing chloroform therefrom.

8. Process for manufacture of chloroform, comprising continuously flowing together as liquids acetaldehyde and a calcium hypochlorite solution at such relative rates that there is an excess of available chlorine, said excess being from 10 to 25%, thoroughly and substantially instantaneously mixing them, heating the mixture to a temperature of 70–80° C., and continuously removing vapor containing chloroform from the mixture.

9. Process for manufacture of chloroform comprising continuously flowing together as liquids acetaldehyde and a calcium hypochlorite solution, said hypochlorite being maintained in a constant excess of not more than about 25%, thoroughly and substantially instantaneously mixing them, heating the mixture to a temperature of 70–80° C., maintaining the mixture at said temperature for 2.5–12.5 minutes while continuously removing vapor containing chloroform from the mixture, additionally heating and agitating the residue to remove further chloroform as vapor, condensing said vapors and mechanically separating liquid chloroform from the condensate.

10. Process for manufacture of chloroform comprising continuously flowing together as liquids acetaldehyde and a calcium hypochlorite solution containing suspended solids, said hypochlorite being maintained in a constant excess of not more than about 25%, thoroughly and substantially instantaneously mixing them, heating the mixture to a temperature of 70–80° C., continuously removing vapor containing chloroform from the mixture, condensing said vapor and mechanically separating liquid chloroform from the condensate.

11. Process for manufacture of chloroform comprising continuously flowing together as liquids acetaldehyde and a calcium hypochlorite solution containing suspended solids at such relative rates that there is an excess of available chlorine, said excess being from 10 to 25%, thoroughly and substantially instantaneously mixing them, heating the mixture to a temperature of 70–80° C., and continuously removing vapor containing chloroform from the mixture.

12. Process for manufacture of chloroform comprising continuously flowing together as liquids acetaldehyde and a calcium hypochlorite solution containing suspended solids, said hypochlorite being maintained in a constant excess of not more than about 25%, thoroughly and substantially instantaneously mixing them, heating the mixture to a temperature of 70–80° C., maintaining the mixture at said temperature for 2.5–12.5 minutes, continuously removing vapor containing chloroform from the mixture, additionally heating and agitating the residue to remove further chloroform, condensing said vapors and mechanically separating liquid chloroform from the condensate.

13. Process for manufacture of chloroform comprising continuously flowing together as liquids acetone and a hypochlorite solution, the relative proportions of said hypochlorite and acetone being maintained substantially constant without a large excess of either reactant, thoroughly mixing them, heating the mixture, continuously removing vapor containing chloroform therefrom, condensing said vapor and mechanically separating liquid chloroform from the condensate.

14. Process for manufacture of chloroform comprising continuously flowing together as liquids acetone and a calcium hypochlorite solution, said hypochlorite being maintained in a constant excess of not more than about 25%, thoroughly and substantially instantaneously mixing them, heating the mixture to a temperature of 70–80° C., continuously removing vapor containing chloroform from the mixture, condensing said vapor and mechanically separating liquid chloroform from the condensate.

15. Process for manufacture of chloroform comprising continuously flowing together as liquids acetone and a calcium hypochlorite solution at such relative rates that there is an excess of available chlorine, said excess being from 10 to 25%, thoroughly and substantially instantaneously mixing them, heating the mixture to a temperature of 70°–80° C., and continuously removing vapor containing chloroform from the mixture.

16. Process for manufacture of chloroform comprising continuously flowing together as liquids acetone and a calcium hypochlorite solution, said hypochlorite being maintained in a constant excess of not more than about 25%, thoroughly and substantially instantaneously mixing them, heating the mixture to a temperature of 70°–80° C., maintaining the mixture at said temperature for 2.5–12.5 minutes while continuously removing vapor containing chloroform from the mixture, additionally heating and agitating the residue to remove further chloroform as vapor, condensing said vapors and mechanically separating liquid chloroform from the condensate.

17. Process for manufacture of chloroform comprising continuously flowing together as liquids acetone and a calcium hypochlorite solution containing suspended solids, said hypochlorite being maintained in a constant excess of not more than about 25%, thoroughly and substantially instantaneously mixing them, heating the mixture to a temperature of 70–80° C., continuously removing vapor containing chloroform from the mixture, condensing said vapor and mechanically separating liquid chloroform from the condensate.

18. Process for manufacture of chloroform comprising continuously flowing together as liquids acetone and a calcium hypochlorite solution containing suspended solids at such relative rates that there is an excess of available chlorine, said excess being from 10 to 25%, thoroughly and substantially instantaneously mixing them, heating the mixture to a temperature of 70–80° C., continuously removing vapor containing chloroform from the mixture, additionally heating and agitating the residue to remove further chloroform as vapor, condensing said vapors and mechanically separating liquid chloroform from the condensate.

19. Process for manufacture of chloroform comprising continuously flowing together as liquids acetone and a calcium hypochlorite solution containing suspended solids, said hypochlorite being maintained in a constant excess of not more than about 25%, thoroughly and substantially instantaneously mixing them, heating the mixture to a temperature of 70–80° C., maintaining the mixture at said temperature for 2.5–12.5 minutes, continuously removing vapor containing chloroform from the mixture, additionally heating and agitating the residue to remove further chloroform as vapor, condensing said vapors and mechanically separating liquid chloroform from the condensate.

Signed at Niagara Falls, in the county of Niagara and State of New York this 19th day of September A. D. 1930.

PAUL JOHNSON CARLISLE.